United States Patent
Marcusen et al.

(10) Patent No.: US 11,052,810 B2
(45) Date of Patent: Jul. 6, 2021

(54) TRANSPORTATION CARTS FOR GAS BOTTLES

(71) Applicant: Illinois Tool Works Inc., Glenview, IL (US)

(72) Inventors: David Paul Marcusen, Hortonville, WI (US); Nicholas James Dessart, Appleton, WI (US); Daniel James Helein, Sherwood, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/774,382

(22) Filed: Jan. 28, 2020

(65) Prior Publication Data

US 2020/0156526 A1 May 21, 2020

Related U.S. Application Data

(63) Continuation of application No. 15/718,359, filed on Sep. 28, 2017, now Pat. No. 10,576,864.

(51) Int. Cl.
*B60P 3/055* (2006.01)
*B62B 3/10* (2006.01)
*B62B 5/00* (2006.01)

(52) U.S. Cl.
CPC .............. *B60P 3/055* (2013.01); *B62B 3/104* (2013.01); *B62B 5/0089* (2013.01);
(Continued)

(58) Field of Classification Search
CPC ... B60P 3/055; B62B 2202/022; B62B 3/104; B62B 5/0089; B62B 2203/05; B62B 2203/44; B62B 3/04
(Continued)

(56) References Cited

U.S. PATENT DOCUMENTS

| 4,653,765 A | * | 3/1987 | Smalley | .................. B62B 3/104 280/47.2 |
| 4,756,540 A | * | 7/1988 | Crawford | ................ B62B 1/145 280/47.21 |

(Continued)

OTHER PUBLICATIONS

"Millermatic 252" from MIG Arc Welding Power Source, Issued Sep. 2009, Index. No. DC/12.49. Accessed at http://welding.suttongarten.com/Asset/MIG-Welder-Millermatic-252.pdf on Sep. 8, 2020. (Year: 2009).*

(Continued)

*Primary Examiner* — James A Shriver, II
*Assistant Examiner* — Hilary L Johns
(74) *Attorney, Agent, or Firm* — McAndrews, Held & Malloy, Ltd.

(57) ABSTRACT

A cart is disclosed for carrying a gas bottle. The cart includes a wheeled frame and a bottle support platform. The support platform is configured to pivot between a loading position in which a gas bottle may be loaded and/or unloaded from the bottle support platform and a cradle position in which the gas bottle and the bottle support platform are elevated. A bottle rest may support the bottle when the bottle support platform is in the cradle position. A bottle support spine may also, or alternatively, support the bottle during transportation and act as a lever for pivoting the bottle support platform between the loading position and the cradle position.

20 Claims, 5 Drawing Sheets

(52) U.S. Cl.
CPC ..... *B62B 2202/022* (2013.01); *B62B 2203/05* (2013.01); *B62B 2203/44* (2013.01)

(58) Field of Classification Search
USPC .......................................... 280/47.27, 47.35
See application file for complete search history.

(56) References Cited

U.S. PATENT DOCUMENTS

| | | | | |
|---|---|---|---|---|
| 5,290,051 A * | 3/1994 | Olson | ..................... | B62B 1/145 |
| | | | | 280/47.27 |
| 5,415,420 A * | 5/1995 | Koeller | ................... | B62B 1/264 |
| | | | | 248/215 |
| 5,440,098 A * | 8/1995 | Matus | .................... | B23K 9/323 |
| | | | | 219/136 |
| 5,489,183 A * | 2/1996 | Malden | .................. | B62B 1/264 |
| | | | | 280/47.28 |
| 5,683,221 A * | 11/1997 | Ablabutyan | .......... | B60P 1/4457 |
| | | | | 410/94 |
| 5,730,891 A * | 3/1998 | Karpoff | .................... | B23K 9/32 |
| | | | | 219/136 |
| 6,425,724 B1 * | 7/2002 | Williamson | ............ | B62B 1/145 |
| | | | | 280/47.29 |
| 6,557,869 B2 * | 5/2003 | Gillette | ..................... | B62B 1/12 |
| | | | | 280/47.28 |
| 6,590,184 B1 * | 7/2003 | Andersen | ................ | B23K 7/10 |
| | | | | 219/136 |
| 6,596,972 B1 * | 7/2003 | Di Novo | .................. | B23K 9/32 |
| | | | | 219/136 |
| 6,992,266 B1 * | 1/2006 | Di Novo | .................. | B23K 9/32 |
| | | | | 219/136 |
| 7,241,973 B1 * | 7/2007 | Di Novo | ............. | B23K 9/1006 |
| | | | | 219/136 |
| 7,273,216 B1 * | 9/2007 | Hohrman | ................ | B62B 1/264 |
| | | | | 280/47.26 |
| 8,087,679 B1 * | 1/2012 | Salvucci, Jr. | ............. | B62B 3/04 |
| | | | | 280/47.35 |
| 8,536,488 B2 * | 9/2013 | Ertmer | ................... | B23K 9/123 |
| | | | | 219/136 |
| 8,748,777 B2 * | 6/2014 | Ertmer | .................... | B23K 9/32 |
| | | | | 219/136 |
| 2003/0151218 A1 * | 8/2003 | Swaffield | ................ | B62B 3/104 |
| | | | | 280/47.27 |
| 2006/0119059 A1 * | 6/2006 | O'Connor | ................ | B25H 3/00 |
| | | | | 280/47.35 |
| 2006/0119509 A1 | 6/2006 | Wang et al. | | |
| 2006/0196548 A1 * | 9/2006 | Trettin | ................... | B62B 1/264 |
| | | | | 137/355.16 |
| 2007/0031231 A1 * | 2/2007 | Powell | ..................... | B66F 9/06 |
| | | | | 414/629 |
| 2008/0112783 A1 * | 5/2008 | Bock | ........................ | B62B 1/14 |
| | | | | 414/349 |
| 2010/0021275 A1 * | 1/2010 | Ratermann | ............... | B62B 1/14 |
| | | | | 414/454 |
| 2011/0318149 A1 * | 12/2011 | Barnes | ..................... | B62B 3/04 |
| | | | | 414/469 |
| 2012/0074665 A1 * | 3/2012 | Salvucci, Jr. | ........... | B62B 3/104 |
| | | | | 280/47.24 |
| 2013/0106073 A1 * | 5/2013 | Gamard | .................. | B62B 3/104 |
| | | | | 280/79.2 |
| 2014/0159328 A1 * | 6/2014 | Bowden | ..................... | B62B 1/12 |
| | | | | 280/47.27 |
| 2015/0203137 A1 * | 7/2015 | Lang | ....................... | B62B 3/104 |
| | | | | 414/469 |
| 2015/0284016 A1 * | 10/2015 | Berlinger | .................. | B62B 1/12 |
| | | | | 280/47.18 |
| 2015/0329133 A1 * | 11/2015 | Glass | ....................... | B62B 1/14 |
| | | | | 280/47.26 |

OTHER PUBLICATIONS

Miller, "Miller Running Gear Specification Sheet," p. 4.
Int'l Search Report and Written Opinion Appln No. PCT/US2018/052816 dated Jan. 4, 2019 (17 pgs).

* cited by examiner

TRANSPORTATION CARTS FOR GAS BOTTLES

CROSS REFERENCED TO RELATED APPLICATIONS

This application claims the benefit, and is a continuation, of co-pending U.S. application Ser. No. 15/718,359, filed Sep. 28, 2017, which is incorporated herein by reference in its entirety.

TECHNICAL FIELD

The present disclosure relates generally to transportation carts and, more particularly, to transportation carts for gas bottles.

BACKGROUND

In the arc welding industry, a welding power supply is sometimes mounted to a running gear cart. The running gear cart enables the welding power supply, consumables, and/or accessories to be transported with ease to different jobs in an area. One or more large gas bottles/cylinders of inert arc-shielding gases or other gases may be carried on the running gear carts.

Gas bottles are often very heavy, often weighing as much as 180 pounds. Overhead cranes are rarely available at the bottle storage area. Consequently, the usual loading and unloading method has been to manually lift the bottles. For example, a person may hug a bottle and lift it using his back and/or legs.

SUMMARY

A welding power supply cart having a lifting device for raising heavy objects, such as gas bottles, is disclosed, substantially as illustrated by and described in connection with at least one of the figures, and as set forth more completely in the claims.

DESCRIPTION OF THE DRAWINGS

These and other advantages of the present disclosure may be readily understood with the reference to the following specifications and attached drawings wherein.

The figures are not necessarily to scale. Where appropriate, the same or similar reference numerals are used in the figures to refer to similar or identical elements.

DETAILED DESCRIPTION

Preferred embodiments of the present disclosure may be described hereinbelow with reference to the accompanying drawings. In the following description, well-known functions or constructions are not described in detail because they may obscure the disclosure in unnecessary detail. For this disclosure, the following terms and definitions shall apply.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the term "exemplary" means serving as a non-limiting example, instance, or illustration. As utilized herein, the terms "e.g." and "for example" set off lists of one or more non-limiting examples, instances, or illustrations.

As used herein, the word "approximately," when used to modify or describe a value, means reasonably close to that value.

As used herein, the term "attach" means to affix, couple, connect, join, fasten, link, and/or otherwise secure.

As used herein, the term center of gravity generally refers to a point at which, if an item was suspended, it would be balanced in all directions—i.e., a hypothetical balancing point in all directions.

Disclosed example carts include a bottle support platform configured to pivot between a loading position in which a gas bottle may be loaded or unloaded from the bottle support platform without lifting the gas bottle, and a cradle position in which the gas bottle and the bottle support platform are elevated. The example carts may further include wheels configured to support the cart and a bottle rest configured to support the gas bottle and to limit lateral movement of the gas bottle when the bottle support platform is in the cradle position. The bottle support platform may be configured to pivot with respect to the bottle rest.

In some examples the cart includes a locking latch having an engaged position and released position. In such an example, the locking latch may be configured to prohibit pivoting of the bottle support platform when in the engaged position and allow pivoting of the bottle support platform when in the released position. In some examples, the bottle support platform includes one or more partitions that divide the bottle support platform into a plurality of bays, and each bay is configured to retain a gas bottle. In some examples, the cart further includes a gate to secure the gas bottle on the bottle support platform. In such examples, the gate may be pivotally attached to the bottle support platform and configured to pivot between a loading position substantially planar with the bottle support platform and a securing position angled with respect to the bottle support platform. In some examples, the gate is biased towards the securing position. In some examples, the gate comprises a first gate, and the cart further includes a second gate pivotally attached to the bottle support platform and configured to pivot between a loading position substantially planar with the bottle support platform and a securing position angled with respect to the bottle support platform. In such an example, the second gate may be attached to the first gate at a partition, and the partition may divide the bottle support platform into a plurality of bays, with each bay is configured to retain a gas bottle. In some examples, the first gate and the second gate are biased towards the securing position. In some examples, the cart further includes a harness to secure the gas bottle to the cart. In some examples, the cart is a running gear of a welding power supply. In some examples, the bottle support platform is configured to position a center of gravity of the gas bottle substantially vertically above a pivot of the bottle support platform when the bottle support platform is in the cradle position and the cart is positioned substantially horizontally.

Disclosed example carts may also include a frame configured to carry a welding type power supply, wheels configured to support the frame, a bottle support platform configured to pivot between a loading position in which a gas bottle may be loaded or unloaded from the bottle support platform without lifting the gas bottle, and a cradle position in which the gas bottle and the bottle support platform are elevated, and a bottle support spine attached to the bottle support platform, where the bottle support spine is configured to support the gas bottle during transportation and act as a lever for pivoting the bottle support platform between the loading position and the cradle position.

In some examples, the cart may include a locking latch having an engaged position and released position, where the locking latch is configured to prohibit pivoting of the bottle support platform when in the engaged position and allow pivoting of the bottle support platform when in the released position. In some examples, the support platform may include one or more partitions that divide the bottle support platform into a plurality of bays, with each bay configured to retain a bottle. In some examples, the cart may include a gate to secure the gas bottle on the bottle support platform. In such examples, the gate may be pivotally attached to the bottle support platform and configured to pivot between a loading position substantially planar with the bottle support platform and a securing position angled with respect to the bottle support platform. In some examples, the gate is biased towards the securing position. In some examples, the gate comprises a first gate, and the cart further includes a second gate pivotally attached to the bottle support platform and configured to pivot between a loading position substantially planar with the bottle support platform and a securing position angled with respect to the bottle support platform, where the second gate is attached to the first gate at a partition, the partition divides the bottle support platform into a plurality of bays, and each bay is configured to retain a gas bottle. In some examples, the first gate and the second gate are biased towards the securing position. In some examples, the cart further includes a harness to secure the bottle to the cart. In some examples, the bottle support platform is configured to position a center of gravity of the gas bottle substantially vertically above a pivot of the bottle support platform when the bottle support platform is in the cradle position and the frame is positioned substantially horizontally. In some examples, the cart is a running gear of a welding power supply.

Disclosed examples involve a cart having a pivoting platform that lifts a bottle of gas up while tipping the bottle over center into a nesting position integrated on the cart. When the bottle is in the nest the bottle is much more stable than if the bottle were simply standing vertically straight. A spring loaded gate may be used to secure the bottle on the platform. The gate may be pressed to the floor while loading the bottle, then released to retain the bottom of the bottle while tipping the bottle into position. As the bottle approaches a resting position, a latch may engage the platform, thereby preventing it from accidently being tipped back, even though the bottle is over the center of gravity. The latch also allows for retention of the platform in the up position if no bottles are loaded onto the cart.

The cart may be a single bottle or a multiple bottle (e.g., dual bottle) cart design. In some examples, a harness, such as a strap or chain, for instance, may be used instead of the spring loaded gate. In some examples, the platform and gate could be made integral, as a single part. The platform and/or gate may be made of spring steel, for example. In another example, the cart may include a vertical support spine that extends above the center of gravity. The spine may act as a lever, allowing the bottle to be leaned into a resting position.

Figure 1:
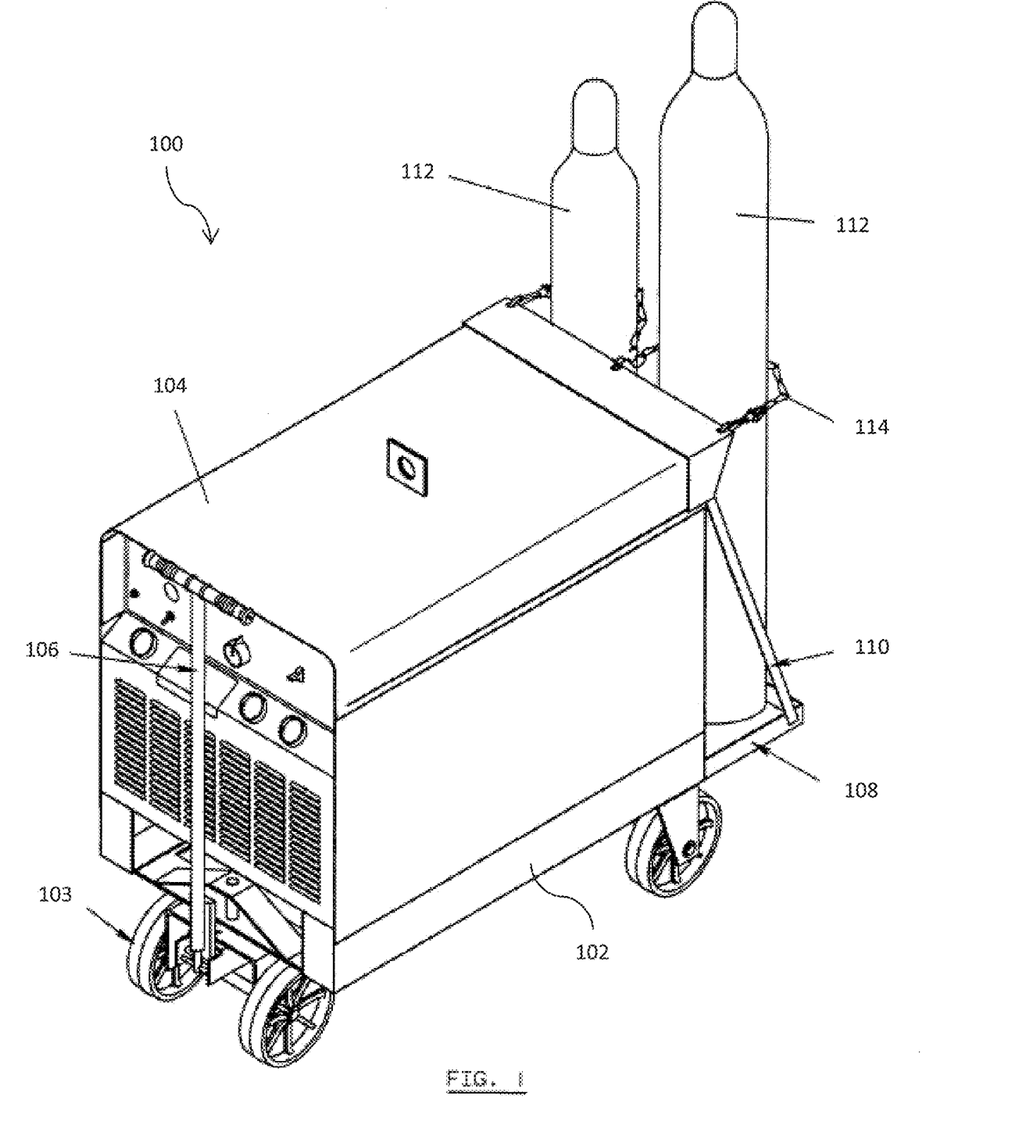
FIG. 1 is a front perspective view of an example cart.

FIG. 1 illustrates an isometric view of an example running gear cart 100. The cart 100 includes a base 102 supported by wheels 103 underneath the base 102. A welding power supply 104 is shown positioned atop and supported by the base 102. A handle 106 is attached to a front portion of the cart 100 base 102 for pulling and/or steering the cart 100, for example. A flat horizontal pan 108 is attached to a rear of the cart 100 base 102. In the example of FIG. 1, the pan 108 is substantially fixed in place and immovable. The pan 108 may be further supported and/or secured by a strut 110. Two bottles 112 are shown atop the pan 108. Chains 114 encircle the bottles 112 to help prevent the bottles 112 from falling off the pan 108. The pan 108 is slightly elevated above the floor. In that manner, the welding power supply 104 and the bottles 112 may be transported together by the running gear cart 100.

Figure 2:
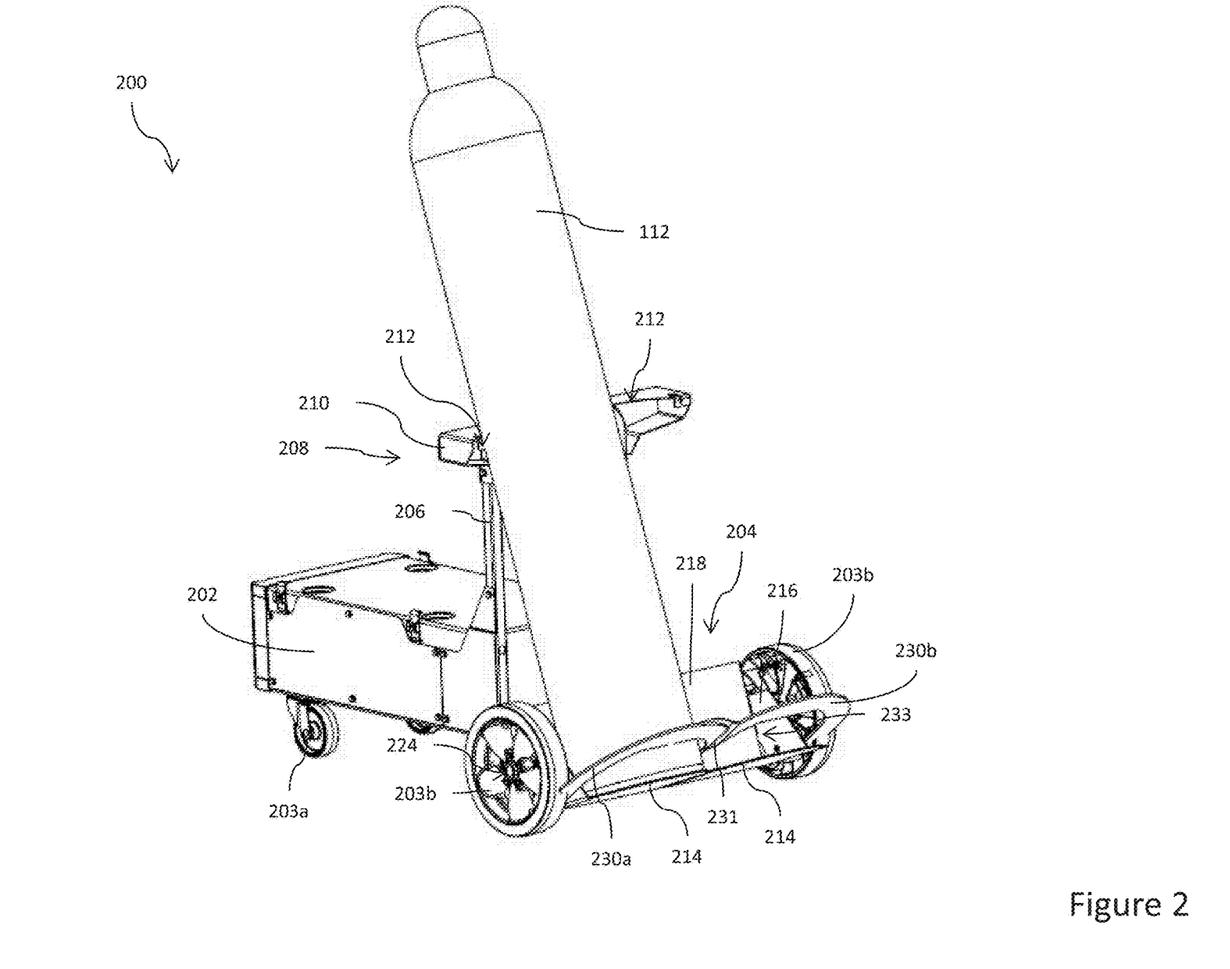
FIG. 2 is a rear perspective view of an example improved cart, having a bottle support platform in a cradle position and a gate in a securing position.
Figure 3:
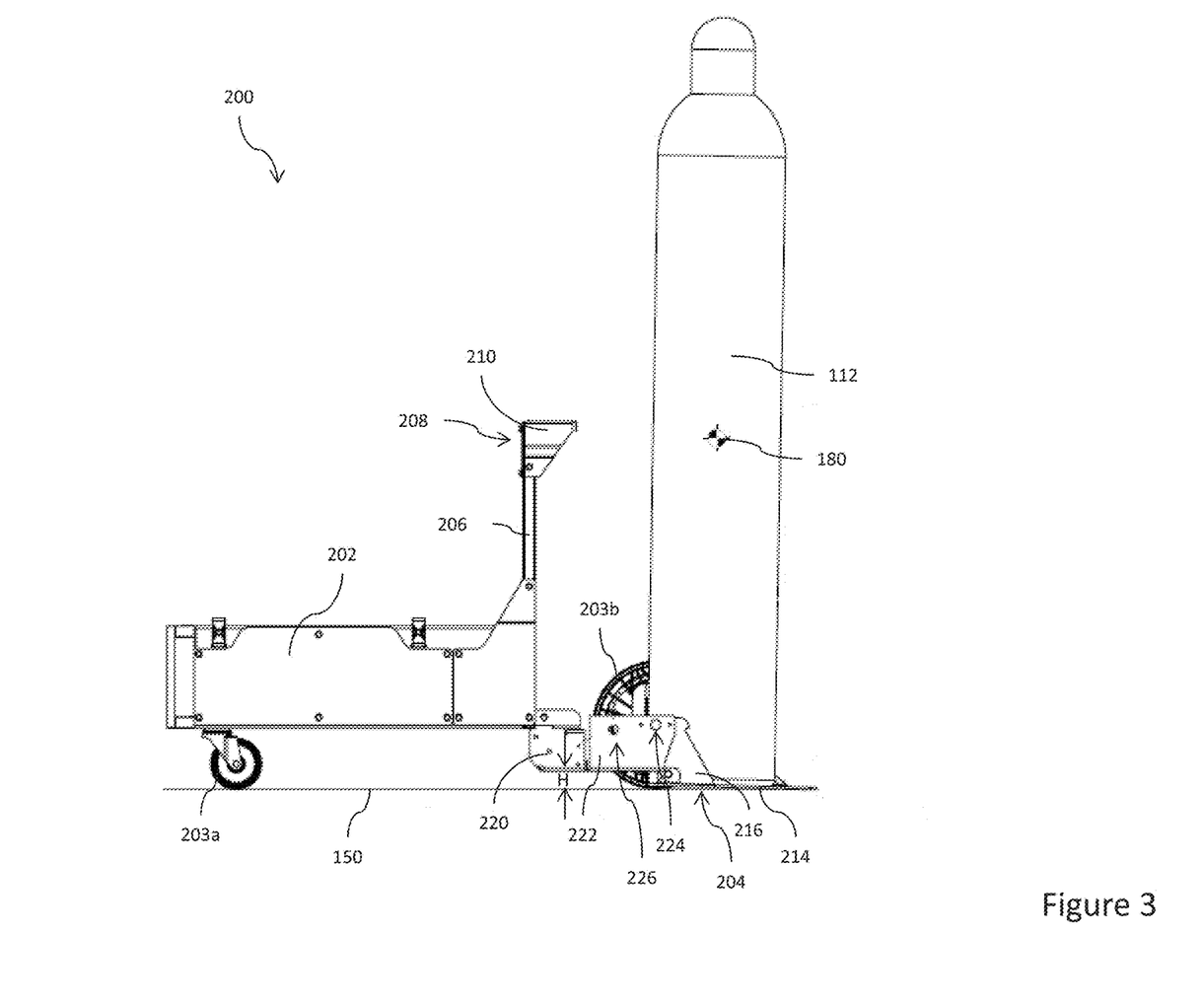
FIG. 3 is a side view of the example improved cart of FIG. 2, with a rear wheel removed and the bottle support platform and gate in the loading position.
Figure 4:
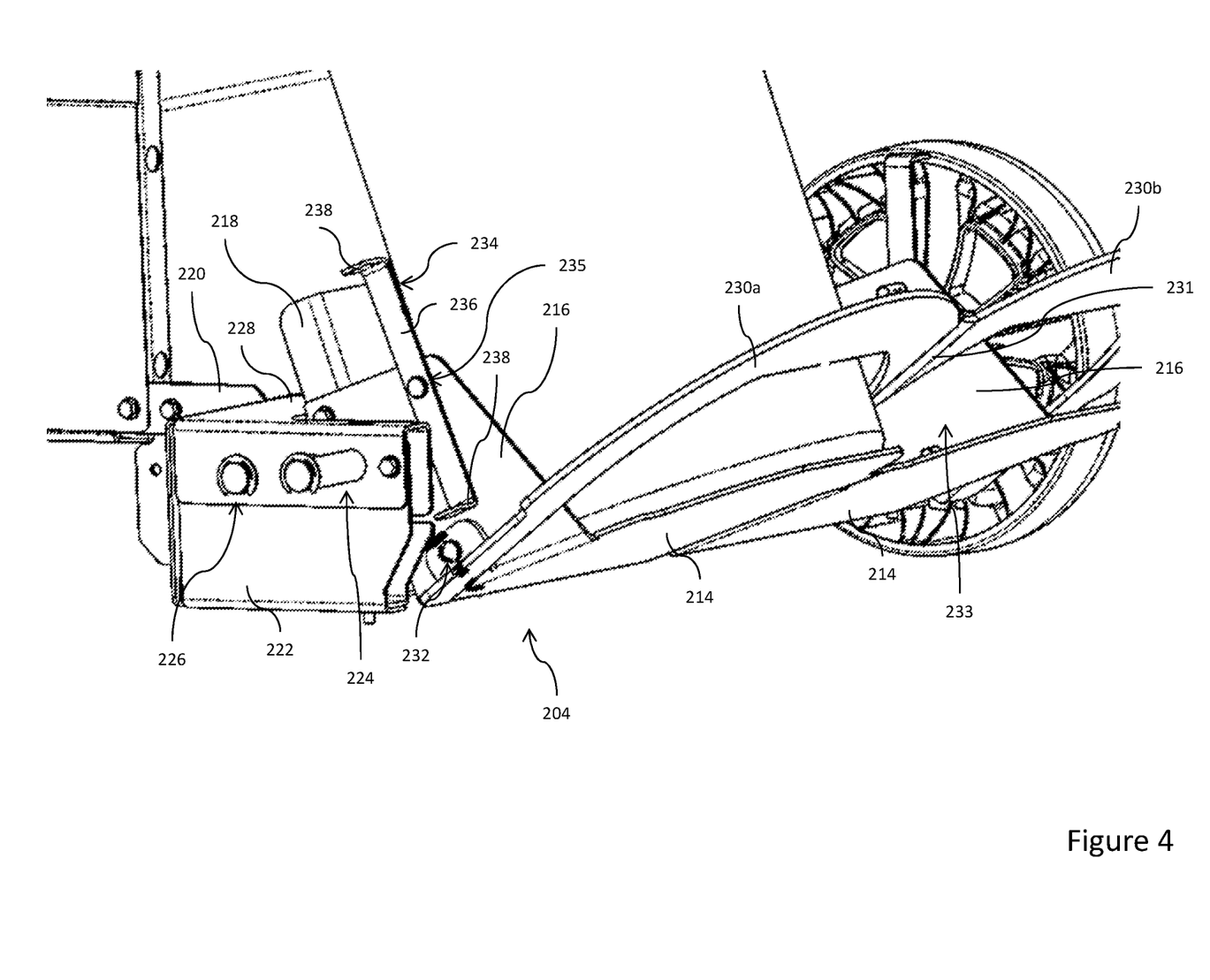
FIG. 4 is an enlarged perspective view of a portion of the example improved cart of FIG. 2, with a rear wheel removed, the bottle support platform in the cradle position, and the gate in the securing position.

FIGS. 2-4 illustrate an example improved cart 200. The cart 200 includes a base frame 202 supported by front wheels 203a and rear wheels 203b. As shown, the diameters of the example rear wheels 203b are larger than the diameters of the front wheels 203a of the cart 200. In alternative examples, the front wheel 203a may be larger than the rear wheels 203b, or both wheels 203 may be approximately the same size. In the example shown in the figures, the front wheels 203a are positioned directly below the frame 202, while the rear wheels 203b are positioned to the sides of the frame 202 and a bottle support platform 204. The frame 202 may be sized and/or proportioned to fit and/or support a power supply, such as a welding power supply 104. In some examples the base frame 202 may include retention structures to secure a welding power supply to the frame 202. A stanchion 206 extends vertically up from a rear of the frame 202 and terminates in a bottle rest 208. In some examples, the stanchion 206 may be positioned closer to a front and/or middle of the cart 200, in order to provide more room for a bottle to tilt before contacting the bottle rest 208. In some examples, the stanchion 206 may be telescoping, or otherwise configured, such that the height of the bottle rest 208 may be changed in order to accommodate different bottle 112 sizes.

As may be seen in FIGS. 2 and 3, the bottle rest 208 includes a lateral support bar 210 with nests 212. The nests 212 may be generally semicircular and/or otherwise shaped to fit and/or support a bottle 112. The nests 212 may be sized to retain a gas bottle 112, and particularly an upper portion of a gas bottle 112. The nests 212 may be cushioned with one or more pads, pillows, and/or other soft material to reduce friction and/or jarring of the bottles 112 during transportation. While the example cart 200 shown in the figures has two nests 212, in alternative examples the cart may include only one nest, or more than two nests.

As may be seen in FIGS. 2-4, the bottle support platform 204 is positioned to the rear of the cart 200, behind the frame 202 and stanchion 206. The example platform 204 has a generally flat, continuous, and planar bottom plate 214. In some examples, the platform 204 may be at least partially discontinuous, comprising a mesh screen and/or spaced support bars, for example, in place of the plate 214. The bottle support platform 204 further includes side panels 216 and a backrest 218.

The bottle support platform 204 is attached to the base frame 202 via a mechanical linkage 220 and a chassis 222. In some examples, the mechanical linkage 220 may be telescoping, or otherwise configured, to move the wheels 203 and/or bottle support platform 204 closer or farther from the base frame 202 to accommodate different bottle 112 sizes and/or weights, and/or other considerations. The linkage 220 is attached to a lower portion of the base frame 202 through mechanical means known to those of ordinary skill in the art (e.g. fasteners, rivets, nails, screws, bolts, magnets, adhesive, etc.). The chassis 222 is connected to the linkage through mechanical means known to those of ordinary skill in the art. In the illustrated example shown in the figures, portions of the linkage 220 and chassis 222 extend below the frame 202 of the cart 200. The linkage 220 and chassis 222 may be elevated a height H about the ground when the cart 200 is on level ground with the frame 202 positioned substantially horizontally. The rear wheels 203b attach to the chassis 222 at axles 224. The bottle support platform 204 is pivotally attached to the chassis 222 at pivot points 226.

The bottle support platform 204 is configured to rotate about the pivot points 226. The bottle support platform 204 is configured to rotate between a loading position, in which the plate 214 is flat and/or flush against the ground 150, such that a gas bottle may be loaded or unloaded from the bottle support platform 204, and a cradle position, in which the bottle support platform 204 (and any bottle on the bottle support platform) is elevated off the ground 150. The bottle 112 and/or bottle support platform 204 may be elevated at least a height H off of the ground when the bottle support platform 204 is in the loading position and the cart 200 is positioned on level ground, substantially horizontally. While in the loading position, an operator is able to move (and/or push, slide, shift, tilt, roll, shimmy etc.) a gas bottle onto the bottle support platform 204 without having to lift the bottle 112 up off of the ground. The bottle support platform 204 may include a slanted and/or angled lip at the edge of the plate 214 to assist an operator in moving the gas bottle 112 onto the plate 214 without having to lift the bottle 112 up off the ground 150. The bottle support platform is configured to position a center of gravity 180 of the gas bottle 112 substantially vertically above a pivot 226 of the bottle support platform 204 when the bottle support platform 204 is in the cradle position and the cart 200 frame 202 is positioned substantially horizontally The bottle support platform 204 may be rotated to a cradle position after a bottle 112 has been loaded onto the bottle support platform 204, and/or when the cart 200 is ready for transport. A backstop 228 of the chassis 222 may prevent rotation of the bottle support platform 204 beyond a certain point when rotating to the cradle position. In some examples, the bottle support platform 204 may be spring loaded and/or biased towards the elevated cradle position, such that a force is needed to keep the bottle support platform 204 on the ground in the loading position. In such an example, the bottle support platform 204 may automatically move to, and/or stay in, a cradle position, elevated off the ground, when there are no bottles 112 (and/or other loads) on the bottle support platform 204. In other examples, the bottle support platform 204 may be unbiased, requiring a manual effort to rotate the bottle support platform 204 between the loading and cradle positions. In some examples, the bottle support platform 204 may be motorized, such that the bottle support platform 204 may be rotated between loading and cradle positions using a motor driven mechanism that is controlled through a corresponding interface.

A gate 230 is pivotally attached to the bottle support platform 204 at joints 232. The joints 232 are positioned on the side support panels 216 of the bottle support platform 204. The gate 230 is configured to rotate about the joint 232 between a loading position and a securing position. When in the loading position, the gate 230 may be substantially planar and/or parallel with the bottom plate 214 of the support platform 204, and/or perpendicular to a backrest 218 of the bottle support platform 204, such that a bottle 112 may be loaded onto the bottle support platform 204. When in a securing position, the gate 230 may be substantially angled with respect to the bottom plate 214 and/or backrest 218 of the bottle support platform 204, so as to secure the bottle 112 in the bottle support platform 204. The configuration of the joint 232 may limit rotational movement beyond the loading and/or securing positions, such that the limit of the gate 230 in a first direction is the loading position, and the limit of the gate in a second direction is the securing position. In alternative examples, the gate 230 may be able to rotate freely beyond the loading and/or securing positions, to the extent the gate 230 is not otherwise limited by the ground 150 (and/or floor), a bottle 112, the bottle support platform 204, the chassis 222, and/or some other structure. In some examples, the platform 204 and gate 230 may be made integral, as a single part. The platform and/or gate may be made of spring steel, for example.

The gate 230 is spring loaded and biased towards the securing position. The gate 230 is thus configured to default to a securing position. While in the securing position, the gate may restrain and/or restrict movement of a gas bottle 112 loaded onto the bottle support platform 204, so that the gas bottle 112 does not fall off the bottle support platform 204. When loading a bottle 112 onto the platform 204, the gate 230 may be lowered to the loading position using a hand, foot, a pole (and/or rod, staff, stick etc.), and/or other means to press down on the gate, thereby rotating the gate 230 towards the ground 150 to the loading position. While the gate 230 is in a loading position, a bottle 112 may be loaded onto the platform 204. As the bottle moves onto the platform, the weight of the bottle 112 itself may hold down the gate 230. After the bottle 112 is entirely onto the plate 214, the gate 230 may be free to rotate back to the securing position, so as to help secure the bottle 112 on the platform 204.

The plate 214 of the platform 204 and the gate 230 may be sized to complement one another. As shown in the figures, both the plate 214 and the gate 230 are rounded, having a generally semicircular and/or truncated circle shape. An inner diameter of the gate 230 is slightly larger or equal to a diameter of the plate 214. An outer diameter of the gate is larger than the diameter of the plate 214. The plate 214 and gate 230 may be substantially planar and continuous with respect to one another when both the plate 214 and the gate 230 are pressed down to the ground 150 in a bottle 112 loading position.

As illustrated in FIG. 4, the gate 230 may comprise multiple gates 230a, 230b. The gates 230 may attach to one another at a partition 231 that divides the bottle support platform 204 into two bays 233. In other examples, there may only be one gate 230 and one bay 233, or more than two gates 230, dividing the platform 204 into more than two bays 233. Each bay 233 is configured to retain one bottle 112. In general, the number of bays 233 may correspond to the number of nests 212 in the bottle rest 208.

As illustrated in FIGS. 2 and 4, the bottle support platform 204 includes two locking latches 234. Each locking latch 234 is configured to rotate between an engaged position, where the locking latch 234 prohibits rotation of the bottle support platform 204, and a released position, where the bottle support platform 204 is free to rotate. Each locking latch 234 is rotatably attached to a side panel 216 of the platform 204 at a hinge 235. Each locking latch 234 comprises a substantially flat bar body 236 with bent and/or hooked ends 238 that extend substantially perpendicular to the body 236. The ends 238 are sized and/or configured to fit into slots 240 on the sides of the chassis 222 when the locking latch 234 is in the engaged position. The chassis 222 and/or locking latch 234 are sized and/or configured such that an end 238 of the locking latch 234 may be rotated into the slot 240 on the chassis 222 to put the locking latch 234 in the engaged position when the platform 204 is in the elevated cradle. Once snugly fit in the slot 240, the locking latch 234 is configured to substantially prevent and/or resist rotation of the platform 204 towards the ground 150 and/or loading position, as a portion of the chassis 222 below the slot 240 will abut the end 238 of the locking latch 234 that is secured in the slot 240. Thus, an operator may lock the platform 204 into its elevated cradle position using the locking latch 234 when transporting a bottle 112. To unlock the platform 204, the other end 238 of the locking latch 234 may be pushed towards the backstop 228 so as to rotate the locking latch 234 into the released position and dislodge the end 238 that is stuck in the slot 240. In alternative examples, the locking latch 234 may have other configurations, such as a hook that attaches to a catch on the backstop 228, for example. In some examples, only one locking latch 234 and one corresponding slot 240 may be used. The locking latch 234 may be in the released position, and prohibited from moving to the engaged position, when the bottle support platform 204 is in the loading position.

In operation, an operator may need to load a bottle 112 onto the cart 200 for transport, either by itself or in conjunction with the transportation of equipment (e.g. a welding power supply). To load the bottle 112, an operator may move the cart 200 near to where the bottle 112 is currently stored. The bottle 112 may be in a standing position when stored, or moved to a standing position by the operator. The operator may rotate the locking latch 234 to a released position (if it is not already in a released position) and rotate the bottle support platform 204 to the loading position. Afterwards, or at the same time, the operator may push down the gate 230 to the loading position, so as to open a bay 233 for loading. The latch 234, gate 230, and/or bottle support platform 204 may be moved by an operator's foot, for instance.

Once both the plate 214 and gate 230 are in the loading position, the operator may move the bottle 112 past the gate 230 and onto the plate 214 of the bottle support platform 204. The bottle 112 may be moved by shimmying, rolling, and/or tipping the base back and forth, to sort of slide it along the ground 150 and onto the bottle support platform 204, for example. With the plate 214 flush against the ground 150 (and the gate 230 down), there will likely be no need to lift the bottle entirely off the ground, which makes it much easier for an operator to load the bottle 112. While the bottle 112 is moving across the gate 230 onto the bottle support platform 204, the gate 230 may be held down by the weight of the bottle 112.

Once the bottle 112 is positioned in a bay 233 of the bottle support platform 204, the gate 230 may spring back to the securing position, provided nothing is holding the gate 230 down. The operator may then repeat the process to load another bottle into another bay, provided there are other open bays 233 and/or bottles 112 to be loaded. After loading all the possible and/or desired bottles 112, the bottle support platform 204 may be rotated to the cradle position. This rotation may be performed, for example, by pushing on the backrest 218 of the bottle support platform 204, and/or by pushing on a middle and/or upper portion the gas bottle 112, which may in turn push on the backrest 218 of the bottle support platform, causing rotation of the bottle support platform 204 about its pivot 226. The bottle 112 may be prevented from sliding off the bottle support platform 204 during rotation by the gate 230. To the extent a lower portion of the bottle 112 presses against the gate 230, this may also help to rotate the bottle support platform 204. As the bottle support platform 204 is rotated to the cradle position, a portion of the bottle 112 may come to sit in a nest 212 of the bottle rest 208, so as to further support the bottle 112 during transport. In this position the bottle 112 should be substantially stable. Finally, the bottle support platform 204 may be locked against unwanted movement by rotating the locking latch 234 into a locking engagement with the slot 240 of the chassis 222. With the bottle 112 secured to the bottle support platform 204, and the bottle support platform 204 locked in place, the cart 200 may be moved.

Figure 5:
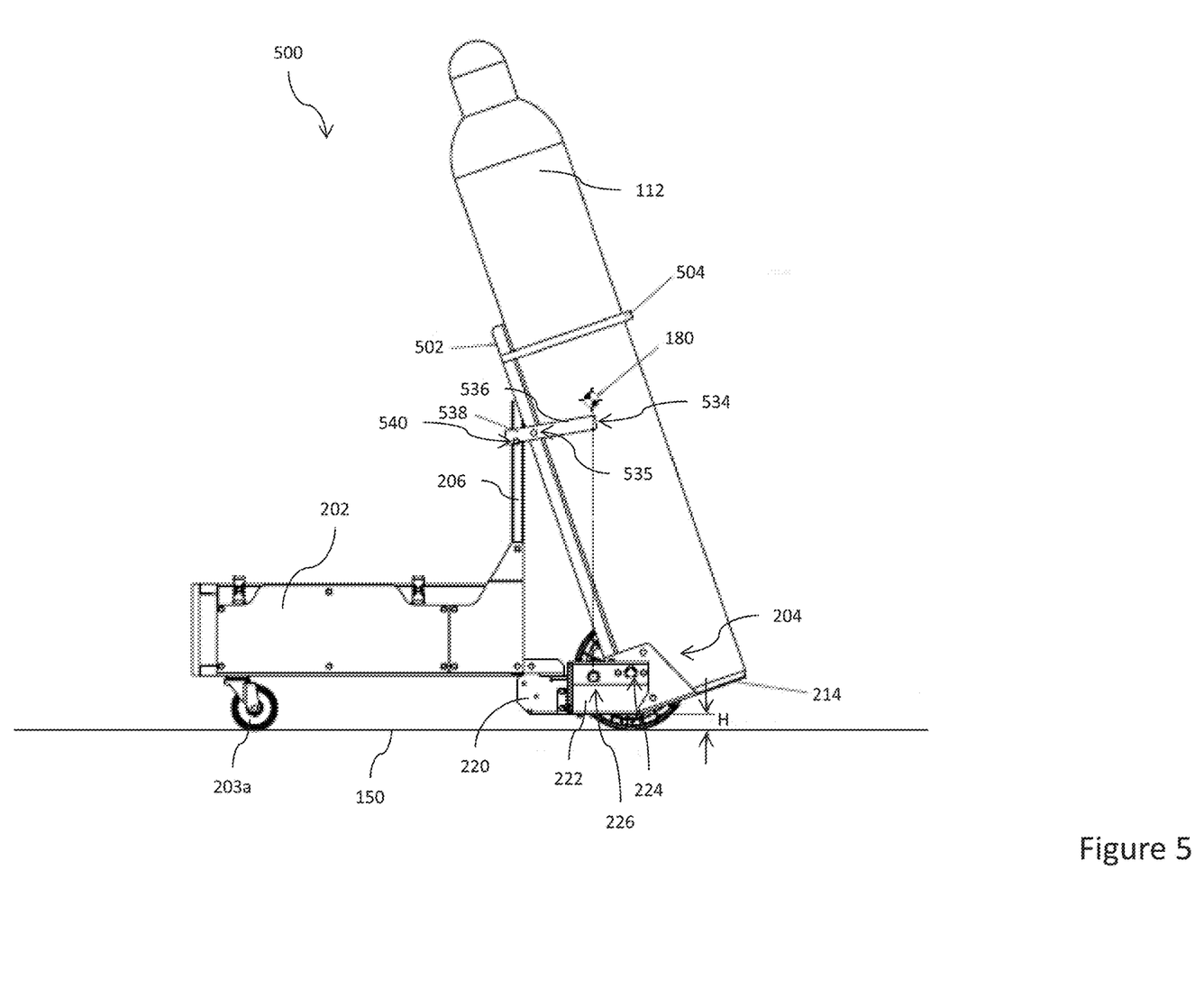
FIG. 5 is a side view of an alternative example improved cart, with a rear wheel removed and the bottle support platform in the cradle position.

FIG. 5 illustrates an alternative example improved cart 500. The cart 500 is similar in most respects to the cart 200. The cart 500 may differ from the cart 200 in that the cart 500 uses a locking latch 534, a spine 502, and harness 504 to help stabilize and secure the bottle 112. As shown in the figures, the alternative cart 500 has a vertical support spine 502 that extends upwards from the bottle support platform 204. The spine 502 may be a vertical extension of the backstop 228 of the bottle support platform 204. Alternatively, the spine 502 may be a separate structure that attaches to the backstop 228 and/or plate 214 of the bottle support platform 204. The spine 502 may span the entire width of the bottle support platform 204, from side panel 216 to side panel 216, or may be more of a pillar positioned in the back of a bay 233 and/or towards the middle of the bay 233. In some examples, there may be one support spine 502 for each bay 233.

A harness 504, such as a strap and/or chain, for example, may wrap around the bottle 112 and attach to the spine 502. In some examples, the harness 504 may wrap around the bottle 112 and attach to the stanchion 206. In some examples, the harness 504 may wrap around the bottle 112 and attach to itself, such as with a fabric hook and loop fastener (i.e. Velcro®), a magnet, a ratchet tie down, a bungee tie down, a combination and/or key lock, a tie, and/or some other mechanism known to those of ordinary skill in the art. The spine 502 may be configured to sit in a nest 212 of the bottle rest 208. Alternatively, a modified bottle rest 208 with no nests 212 may be used, such that the spine 502 rests against the bar 210. In another example, the bottle rest 208 may be removed entirely. In operation, the spine 502 may be used as a lever to tilt the bottle 112 and the rotate the bottle support platform 204 (when the bottle support platform is 204 not locked in place).

A locking latch 534 may be attached to the vertical support spine 502 at a hinge 535 on the spine 502. In some examples, a locking latch 234 attached to the bottle support platform 204, as with the cart 200, may also be used, such that there are two locking latches 534, 234 used. In other examples, only the locking latch 534 may be used. The locking latch 534 may have a hooked end or a hooked portion 538 carved out of its bar body 536 near the end 238. The hook 538 may engage with a protrusion 540 on the stanchion 206 to lock the bottle support platform 204 in place and prevent rotation towards the ground 150. In some examples, there may be a separate stanchion 206 and protrusion 540 for each vertical support spine 502 in each bay 233. In some examples, the locking latch 534 may be attached to an extension, so as to help align the locking latch on the protrusion 540. In some examples, the extension may be telescoping and/or otherwise adjustable. In some examples, the hook 538 may hook onto and/or around the lateral support bar 210 of the bottle rest 208, or some other similar structure.

Though FIG. 5 shows the cart 500 without the gate 230 and/or the lower locking latches 234, in some examples the cart 500 may also use the latches 234 and the gate 230. In examples where there is no gate 230, the bottle support platform 204 may be divided into bays 233 with a static partition attached to the plate 214 and/or backrest 218.

The disclosed carts 200, 500 may be configured for a variety of gas bottles 112. The gas bottles 112 may contain, for example, propane, acetylene, argon, helium, carbon dioxide, oxygen, and/or any other suitable gases. The gas bottles 112 may also contain blends of gases. The gas bottles 112 may contain shielding gases, for example. The carts 200, 500 may be configured for gas bottles 112 having a volume between 20 cubic feet to 400 cubic feet, for example. In an exemplary example, the carts 200, 500 may be configured for a 300 cubic foot gas bottle. In some examples, the carts 200, 500 may be configured for gas bottles having a volume between 6 pounds and 100 pounds. In some examples, the carts 200, 500 may be configured for gas bottles having a height ranging from 14 inches to 75 inches. In an exemplary example, the carts 200, 500 may be configured for a bottle 112 having a height of 55 inches. In some examples, the carts 200, 500 may be configured for a gas bottle 112 having a diameter between 5 inches and 20 inches. In an exemplary example, the carts 200, 500 may be configured for a bottle 112 having a diameter of 9 inches.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A cart, comprising:
   a chassis; and
   a bottle support platform coupled to the chassis, the bottle support platform comprising a backrest and a bottom plate and configured to pivot at a pivot joint, relative to the chassis, between:
      a loading position in which a side of the bottom plate opposite the pivot joint is lower than the pivot joint when the chassis is positioned horizontally, and the gas bottle can be loaded or unloaded from the bottle support platform without lifting the gas bottle, and
      a cradle position in which the side of the bottom plate opposite the pivot joint is above the pivot joint when the chassis is positioned horizontally, and the gas bottle is supported by the bottle support platform, and the gas bottle and the bottle support platform are elevated,
   wherein the chassis is configured to abut the backrest when the bottle support platform is in the cradle position, thereby preventing further pivoting of the bottle support platform.

2. The cart of claim 1, further including a locking latch having an engaged position where the locking latch is engaged with the chassis, and a released position where the locking latch is not engaged with the chassis, wherein the locking latch is configured to prohibit pivoting of the bottle support platform from the cradle position to the loading position when in the engaged position and allow pivoting of the bottle support platform when in the released position.

3. The cart of claim 2, wherein the locking latch engages with the chassis when the locking latch is in the engaged position.

4. The cart of claim 1, further including a gate to secure the gas bottle on the bottle support platform, wherein the gate is pivotally attached to the bottle support platform by way of a joint, and configured to pivot about the joint between a loading position substantially planar with the bottle support platform and a securing position angled with respect to the bottle support platform.

5. The cart of claim 4, wherein the gate is biased towards the securing position.

6. The cart of claim 4, wherein the gate comprises a first gate, wherein the cart further includes a second gate pivotally attached to the bottle support platform and configured to pivot between a loading position substantially planar with the bottle support platform and a securing position angled with respect to the bottle support platform, wherein the second gate is attached to the first gate at a partition, wherein the partition divides the bottle support platform into a plurality of bays, and wherein each bay is configured to retain a gas bottle.

7. The cart of claim 6, wherein the first gate and the second gate are biased towards the securing position.

8. The cart of claim 1, further including a harness to secure the gas bottle to the cart.

9. The cart of claim 1, wherein the chassis is mechanically linked to a frame sized or proportioned to support a welding power supply.

10. The cart of claim 1, wherein the bottle support platform is configured to position a center of gravity of the gas bottle substantially vertically above a pivot of the bottle support platform when the bottle support platform is in the cradle position and the cart is positioned substantially horizontally.

11. A cart, comprising:
   a frame configured to carry a welding type power supply;
   a chassis coupled to the frame; and
   a bottle support platform pivotally attached to the chassis by way of a joint, the bottle support platform comprising a backrest and a bottom plate and configured to pivot about the joint between:
      a loading position in which a gas bottle can be loaded or unloaded from the bottle support platform without lifting the gas bottle, and
      a cradle position in which the gas bottle and the bottle support platform are elevated,
   wherein the chassis is configured to abut the backrest when the bottle support platform is in the cradle position, thereby preventing further pivoting of the bottle support platform,
   wherein the bottle support platform is configured to position a center of gravity of the gas bottle substantially vertically above a pivot of the bottle support platform when the bottle support platform is in the cradle position and the frame is positioned substantially horizontally.

12. The cart of claim 11, further including a locking latch having an engaged position and released position, wherein the locking latch is configured to prohibit pivoting of the bottle support platform when in the engaged position and allow pivoting of the bottle support platform when in the released position.

13. The cart of claim 11, wherein the support platform includes one or more partitions that divide the bottle support platform into a plurality of bays, wherein each bay is configured to retain a bottle.

14. The cart of claim 11, further including a gate to secure the gas bottle on the bottle support platform, wherein the gate is pivotally attached to the bottle support platform by way of a joint, and configured to pivot about the joint between a loading position substantially planar with the bottle support platform and a securing position angled with respect to the bottle support platform.

15. The cart of claim 14, wherein the gate is biased towards the securing position.

16. The cart of claim 14, wherein the gate comprises a first gate, wherein the cart further includes a second gate pivotally attached to the bottle support platform and configured to pivot between a loading position substantially planar with the bottle support platform and a securing position angled with respect to the bottle support platform, wherein the second gate is attached to the first gate at a partition, wherein the partition divides the bottle support platform into a plurality of bays, and wherein each bay is configured to retain a gas bottle.

17. The cart of claim 16, wherein the first gate and the second gate are biased towards the securing position.

18. The cart of claim 11, further including a harness to secure the bottle to the cart.

19. The cart of claim 11, wherein the cart is a running gear of a welding power supply.

20. The cart as defined in claim 1, wherein the bottle support platform is configured to pivot with respect to the chassis via only a single pivot joint.

* * * * *